Feb. 6, 1968 — R. B. POND — 3,367,057
FISH LURE
Filed July 6, 1965
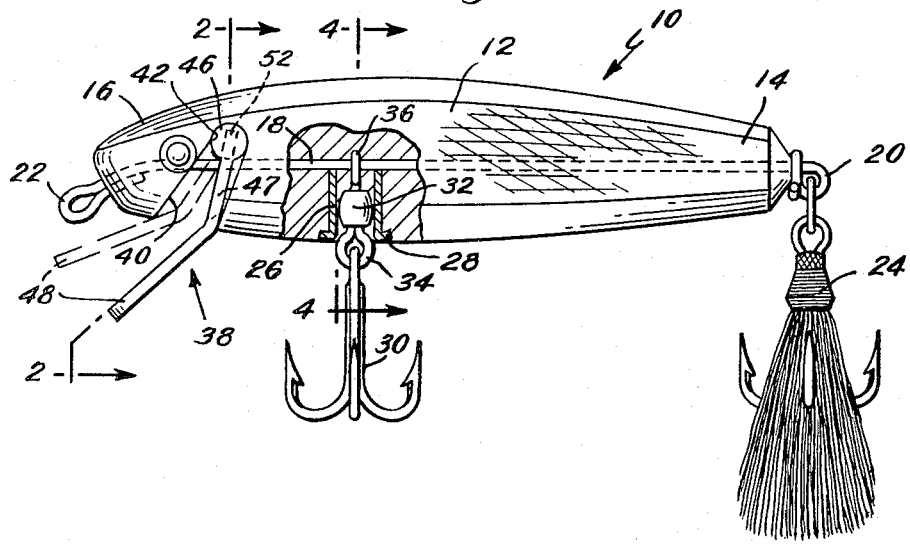
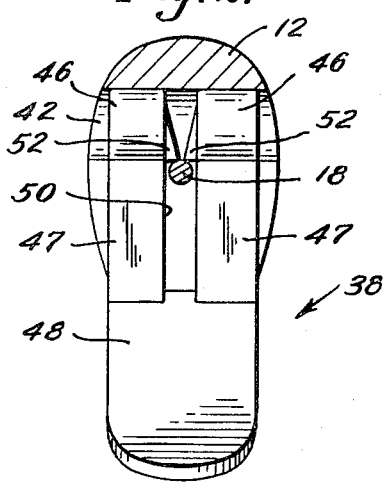
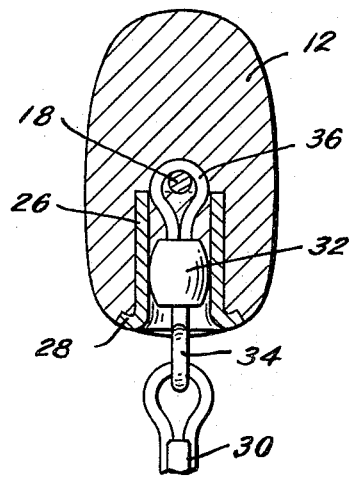
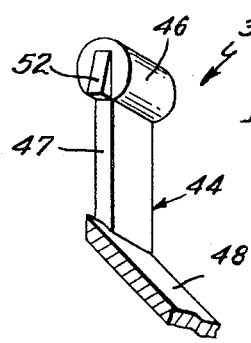
Inventor,
Robert B. Pond,
by Salter & Michaelson
Att'ys.

United States Patent Office 3,367,057
Patented Feb. 6, 1968

3,367,057
FISH LURE
Robert B. Pond, South Attleboro, Mass., assignor to Atom Manufacturing Co., Inc., South Attleboro, Mass., a corporation of Massachusetts
Filed July 6, 1965, Ser. No. 469,474
8 Claims. (Cl. 43—42.02)

ABSTRACT OF THE DISCLOSURE

A fish lure having a central longitudinally extending rod fixed in the body thereof, and to the forward end of which an outwardly extending lip is pivotally mounted, the lip providing for a swimming action of the lure when it is pulled through the water.

---

It is desirable in the use of fish lures to provide a realistic movement of the lure in the water so as to create a swimming action that may be attractive to fish. Creating a swimming action for underwater-type lures has been obtained heretofore through the use of flaps or lips that are located at the front or head portion of the lure. The present invention, however, is unique in the manner of attachment of the lip to the body portion of the lure. In this connection, a rod is embedded in the body portion of the lure and extends substantially therethrough along the longitudinal axis thereof. Adjacent to the head portion of the lure body is a cutout or notch that exposes a portion of the embedded rod. The lip or flap of the present invention is formed with a tongue, to the inner edge of which is a beaded portion or pintle is joined, the pintle being received within the inner edge of the groove for pivotal movement therein. In order to removably mount the lip on the rod, the inner portion of the tongue and the pintle are split to define a slot for receiving the rod. The edges of the pintle that are located adjacent to the slot have wedge-like elements formed thereon that define a V-shaped restriction wherein the rod is removably received in positive engagement in the lip. The lip is thus pivotally mounted on the embedded rod but may be removed therefrom as required.

Accordingly, it is an object of the present invention to provide a fish lure through which a rod extends and on which a lip is pivotally mounted.

Another object of the invention is to provide a fish lure having a notch formed adjacent to the head portion thereof and in which a lip is mounted for pivotal movement.

Still another object is to provide a pivotally mounted lip for use in a fish lure that is formed with a restricted slot therein that enables the lip to be removably mounted in positive engagement on a rod that extends through the body of the lure and is embedded therein.

Other objects, features and advantages of the invention will become apparent as the description thereof proceeds when considered in connection with the accompanying illustrative drawings.

In the drawings which illustrate the best mode presently contemplated for carrying out the invention:

FIG. 1 is an elevational view with parts shown in section of the fish lure embodied in the present invention;

FIG. 2 is a sectional view taken along lines 2—2 in FIG. 1;

FIG. 3 is a perspective view of a half-portion of the lip that is mounted for pivotal movement in the lure body; and FIG. 4 is a sectional view taken along lines 4—4 in FIG. 1.

Referring now to the drawing and particularly to FIG. 1, the fish lure embodied in the present invention is illustrated and is generally indicated at 10. The fish lure 10 is comprised of tapered body 12 that simulates the body of a fish and that includes a tail portion 14 and a head portion 16. The body 12 is preferably molded of a plastic material which may be pigmented with any desired color to add interest to the lure.

Molded integrally in the body 12 and extending the length thereof along the lonigtudinal axis is a rod 18, the outermost ends of which project outwardly of the tail and head portions, terminating in loops 20 and 22. A hook of any conventional type indicated at 24 may be attached to the loop 20 at the tail of the lure, while the loop 22 is adapted to be interconnected to the fishing line.

Also embedded within the body 12 is an eyelet 26, the innermost end of which communicates with the rod 18 and the outermost end of which is formed with an attaching flange 28. A hook 30 is interconnected to the rod 18 by means of a swivel connection 32. As shown in FIG. 4, the swivel connection includes a rotatable outer loop 34 and a rotatable inner loop 36, the outer loop 34 being interconnected to the hook 30 and the inner loop 36 receiving the rod 18 therethrough.

In order to provide for an interesting effect in the operation of the lure 10, a flap or lip generally indicated at 38 is mounted for pivotal movement in the head portion 16 of the body 12. In order to accommodate the lip 38, the head portion 16 is formed with a substantially V-shaped notch 40 that terminates at the inner end thereof in a circular-like groove 42. The lip 38 is illustrated in detail in FIGS. 2 and 3, and, as shown therein, includes a tongue 44, formed with an inner portion 47 to the innermost end of which an enlarged beaded edge or cylindrical pintle 46 is joined. Joined to the outer end of the inner portion 47 of the tongue 44 and extending at an angle with respect thereto is an outer tongue portion 48. As shown in FIG. 1, the inner tongue portion 47 of the lip 38 projects inwardly within the notch 40, the outer tongue portion 48 extending outwardly and being pivotally movable to promote a swimming action of the lure when it is pulled through the water.

Referring again to FIGS. 2 and 3, the lip 38 is shown formed with a slot 50 that extends through the enlarged pintle 46 and through the inner portion 47 of the tongue 44. Formed on the edges of the enlarged pintle 46 that are located adjacent to the slot 50 are wedge portions 52, which, as shown in FIG. 2, cooperate to produce a V-shaped configuration that defines a restriction in the slot 50. It is seen that the most restricted area of the space between the wedge portions 52 is smaller than the diameter of the rod 18, and thus the lip 38 is mounted in position by forcing the rod 18 between the wedge portions 52 until the inner tongue portions adjacent to the slot 50 are forced apart sufficiently to permit movement of the rod 18 into the slot 50. As further seen in FIG. 1, the enlarged groove 42 extends inwardly beyond the rod 18, thereby exposing a portion of the rod 18 that projects through the notch 40. With the portion of the rod 18 exposed in the notch 40, the lip 38 may be conveniently mounted in position by forcing the lip 38 upwardly to its seated position, wherein the rod 18 is forced between the wedges 52 and into the notch 50 and the enlarged pintle 46 is received within the groove 42. In this position, the lip 38 is mounted for pivotal movement on the rod 18, the seated enlarged pintle 46 defining the pivot axis therefor. The securement of the lip to the rod 18 also prevents lateral displacement of the lip.

It is seen that in the use of the fish lure 10, a swimming action is provided when the lure is pulled through the water, the lip 38 pivotally moving within the V-shaped notch 40. The pivotal movement of the lip which induces the swimming action provides an interesting effect and is an attraction for fish. Since the lip 38 is mounted for pivotal movement, it will snap up to the dotted-line position during casting and will thereby not inhibit any casting of the line. Thus, in the casting operation, the tail portion 14 will be the leading end of the lure and wind action will act to hold the lip in that position illustrated in dotted lines in FIG. 1. Once the lure enters the water and is put into action by the fisherman through movement of the rod or reeling, the lip 38 will tend to move to the full-line position for producing the swimming action of the lure.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a fish lure, a body including a head portion and a tail portion, a rod fixed in said body and extending therethrough substantially along the longitudinal axis thereof and projecting outwardly of said body at the head and tail portions, a V-shaped notch formed in said head portion simulating a mouth and terminating at the inner end in a circular-like groove, said notch projecting sufficiently into said head portion to expose a portion of said rod that extends therethrough, and a pivotally mounted lip including an inner tongue portion on the inner end of which an enlarged beaded portion is formed that is pivotally received in said groove, said inner tongue portion having a slot formed intermediate the edge thereof that receives the exposed portion of said rod when said lip is located in said notch, said slot having a restriction located therein for retaining said rod in positive position therein, and an outer tongue portion joined to said inner portion and projecting at an angle with respect thereto outwardly of said body, said lip being movable within the limits of the configuration of said V-shaped notch to provide for a swimming action of said lure when it is pulled through water.

2. In a fish lure, a body having a head and tail portion formed thereon, a rod fixed in said body and projecting outwardly thereof at the head and tail portions for receiving hook elements thereon, a notch formed in said head portion simulating a mouth and terminating at the inner end thereof in a circular-like groove, said notch projecting sufficiently into said head portion for exposing a portion of said rod that extends therethrough, and a lip located in said notch and connected to said rod for pivotal movement with respect thereto, said lip being formed with a rounded inner end that is receivable in said circular-like groove in bearing relation and being pivotally movable within the limts of the configuration of said notch to provide for a swimming action of said lure when it is pulled through water.

3. In a fish lure, a body having a head and tail portion formed thereon, a rod fixed in said body and projecting outwardly thereof at the head and tail portions for receiving hook elements thereon, a notch formed in said head portion simulating a mouth and terminating at the inner end thereof in a circular-like groove, said notch being V-shaped in configuration and projecting sufficiently into said head portion for exposing a portion of said rod that extends therethrough, and a lip located in said notch and connected to said rod for pivotal movement with respect thereto, said lip being formed with a rounded inner end that is receivable in said circular-like groove in bearing relation and being pivotally movable within the limits of the configuration of said notch to provide for a swimming action of said lure when it is pulled through water.

4. In a fish lure as set forth in claim 3, said lip further including an inner tongue portion joined to said beaded portion and an outer tongue portion joined to said inner tongue portion in angular relation with respect thereto, said inner tongue portion and beaded portion having a restricted slot formed therein into which said rod is received for positive engagement therein.

5. In a fish lure as set forth in claim 4, wedge members formed on the edges of said beaded portion that are located adjacent to the slot extending therethrough, said wedge members defining a restriction through which the rod is inserted when said lip is mounted on said rod in said notch.

6. In a fish lure as set forth in claim 5, a tubular insert extending into said body intermediate the head and tail portions and communicating with the rod that extends through said body for exposing a portion of said rod, and another hook element having a swivel connection formed thereon that extends into said tubular insert for engagement with said rod, wherein said last named hook element is securely mounted on said body.

7. In a fish lure, a body through which a rod extends, said rod projecting outwardly of said body at least at one thereof for receiving a hook element thereon, and a pivotal lip extending into a notch formed in said body and having a restricted slot formed therein in which the rod is received in positive engagement, said notch terminating at the inner end thereof in a circular-like groove, said lip having a rounded inner end that is received in said circular-like groove in bearing relation and being pivotally movable within the limits of the configuration of said notch to provide for a swimming action of said lure when it is pulled through water.

8. In a fish lure, a body through which a rod extends, said rod projecting outwardly of said body at least at one end thereof for receiving a hook element thereon, and a pivotal lip extending into a notch formed in said body and having a restricted slot formed therein in which the rod is received in positive engagement, said notch terminating at the inner end thereof in a circular-like groove, said lip having a beaded or rounded inner end that is received in said circular-like groove in bearing relation and being pivotally movable within the limits of the configuration of said notch to provide for a swimming action of said lure when it is pulled through water, said lip including an inner tongue portion, to the inner end of which said beaded end is joined, and an outwardly extending outer tongue portion that is joined to said inner tongue portion in inclined relation with respect thereto, said restricted slot extending through said beaded end and inner tongue portion intermediate the ends thereof, and wedge elements formed on the ends of said beaded end that are adjacent to said slot and defining a restriction therefor, wherein said rod is received in said slot in positive engagement therewith after being forcibly inserted between said wedge elements.

References Cited

UNITED STATES PATENTS

| | | | |
|---|---|---|---|
| 1,093,980 | 4/1914 | Donaly | 43—42.39 X |
| 2,753,648 | 7/1956 | Paterno | 43—42.03 |
| 2,794,288 | 6/1957 | Marshall et al. | 43—42.11 |
| 2,852,881 | 9/1958 | Higdon | 43—42.02 |

SAMUEL KOREN, *Primary Examiner.*

D. J. LEACH, *Assistant Examiner.*